Figure 1:
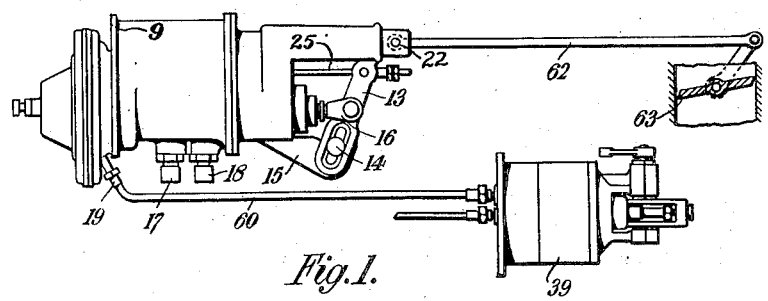

Dec. 5, 1944.  E. DODSON  2,364,352

FLUID OPERATED MEANS FOR CONTROLLING APPARATUS AT A DISTANCE

Filed Nov. 19, 1941  2 Sheets-Sheet 1

INVENTOR
Edward Dodson

BY Moses & Nolte
ATTORNEYS

Dec. 5, 1944.   E. DODSON   2,364,352
FLUID OPERATED MEANS FOR CONTROLLING APPARATUS AT A DISTANCE
Filed Nov. 19, 1941   2 Sheets-Sheet 2

INVENTOR
Edward Dodson
BY Moses + Nolte
ATTORNEYS

Patented Dec. 5, 1944

2,364,352

UNITED STATES PATENT OFFICE 2,364,352

FLUID OPERATED MEANS FOR CONTROLLING APPARATUS AT A DISTANCE

Edward Dodson, Oaks, Puriton, near Bridgwater, England

Application November 19, 1941, Serial No. 419,720
In Great Britain February 1, 1941

3 Claims. (Cl. 137—139)

This invention relates to fluid-pressure-operated remote control systems of the kind, described for example in my United States patent application Serial No. 358,415 filed September 26, 1940, comprising a sender unit at one station, a receiver unit at a distant station, a pipe line connecting the two units, an operating member for the sender unit which is operable to set up a pressure in the pipe line determined by and corresponding to its setting, and a servomotor at the distant station, the control valve whereof is coupled to the pressure-sensitive element of the receiver unit and the piston of which is arranged to take up a position determined by the pressure in the pipe line and consequently by the setting of the operating member of the sender unit.

With such a remote control system difficulties might arise if the pressure in the pipe line should fail, for instance owing to fracture of the pipe line, with the apparatus at the distant station in a position unfavourable to further operation of the apparatus. The invention accordingly provides a remote control system of the kind specified in which the receiver unit comprises, in association with its pressure sensitive element, a biassing device, which is responsive to and normally overridden by the pressure in the pipe line but is operative, in the event of said pressure failing, by cooperation with said pressure-sensitive element to move the piston of the servomotor to a predetermined position.

The invention is of particular, but not exclusive, application to remote acting throttle controls for aircraft engines. In this case, the sender unit will be coupled to the pilot's throttle control and the servo piston associated with the receiver unit to the throttle valve. Should the fluid pressure in the pipe line fail, it is desirable that the biassing device should move the throttle valve to the cruising position, with a view to giving the aircraft the best chance of returning home despite the damage.

Preferably the biassing device associated with the receiver unit is constituted by a spring-loaded diaphragm responsive to the pressure acting on the pressure-sensitive element, the diaphragm carrying a tappet, which is normally maintained by the fluid pressure in a position clear of the pressure-sensitive element but is constrained by the spring, on failure of the pressure, to coact with the pressure-sensitive element and move the servo piston to a predetermined position.

Figures 2, 3:
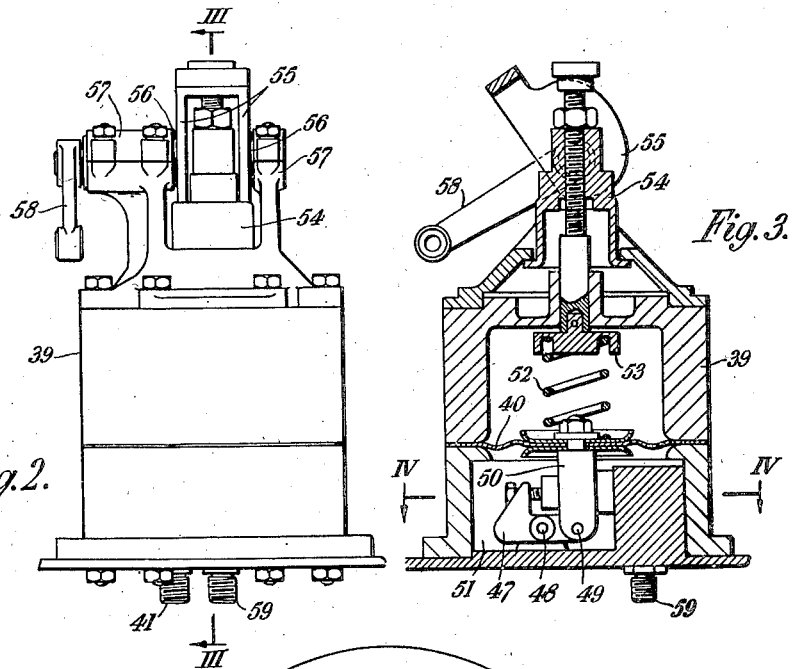
Figure 4:
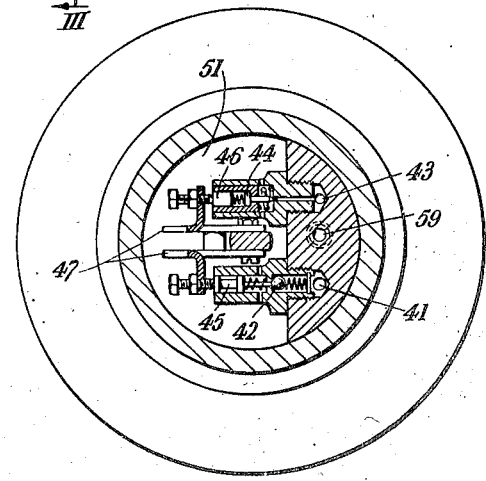
Figure 5:
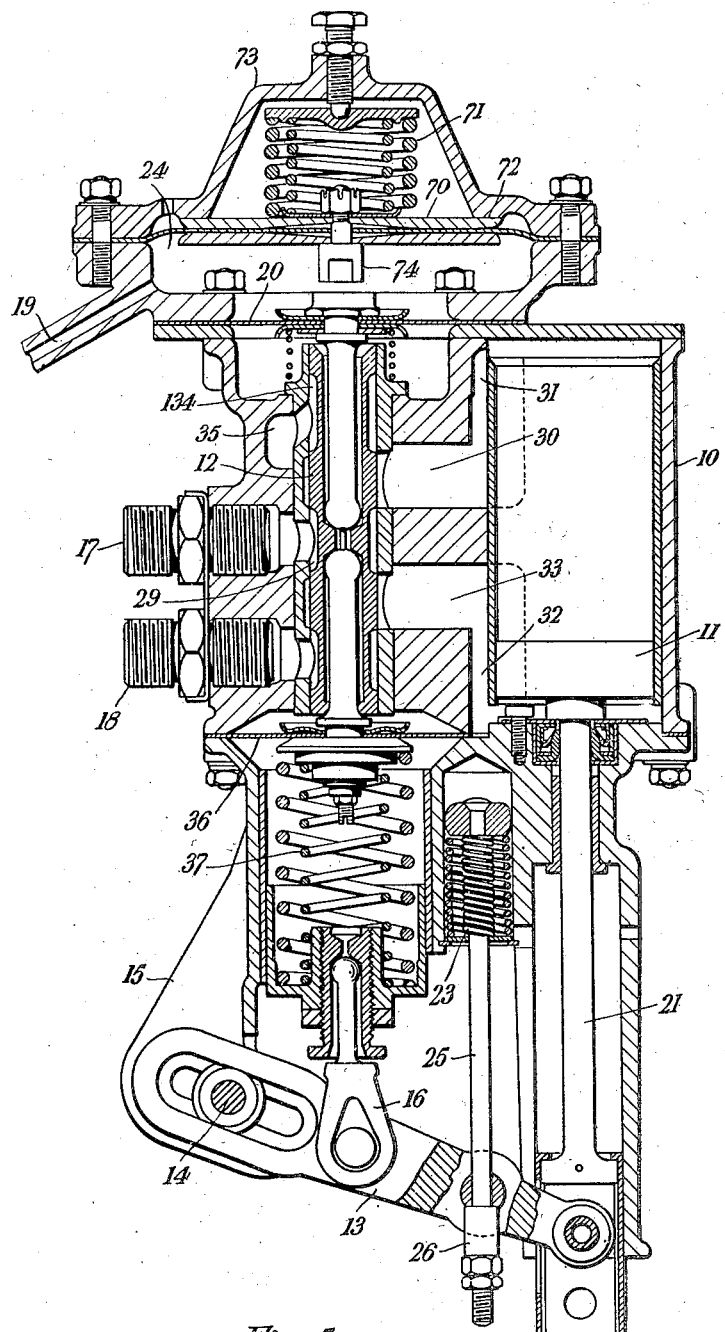

One embodiment of the invention, as applied to a remote acting throttle control for aircraft engines, will now be described in detail, by way of example, with reference to the accompanying drawings, in which:

Fig. 1 is a diagrammatic lay-out of the system,
Fig. 2 is an elevation of the sender unit,
Fig. 3 is a section on the line III—III in Fig. 2,
Fig. 4 is a section on the line IV—IV in Fig. 3, and
Fig. 5 is a section through the receiver unit.

The system comprises a sender unit 39 associated with the pilot's throttle lever and constructed as described in British Specification No. 483,049 and in my United States application Serial No. 358,415 aforesaid, a receiver unit 9 and a pipe line 60 through which compressed air is supplied to the receiver unit under the control of the sender unit. A rod 62 connects the piston rod of the receiver unit servo-motor with the throttle valve 63.

The sender unit 39 (see Figs. 2–4), comprises a two-part casing containing a diaphragm 40 clamped between the two parts of the casing. The upper surface of the diaphragm 40 is exposed to atmospheric pressure and its lower surface is exposed to compressed air admitted to the lower portion 51 of the casing through an inlet 41 under the control of an inlet valve 42. An exhaust port 43 in the lower portion of the casing is controlled by an exhaust valve 44. The valves 42, 44, respectively are actuated by tappets 45, 46 attached to a rocking yoke 47 pivotally mounted at 48 and pivoted at 49 to a lug 50 fixed to the diaphragm 40. Downward movement of the diaphragm therefore tends to rock the yoke 47 clockwise as seen in Figure 3 and so open the inlet valve 42, whilst upward movement of the diaphragm tends to open the exhaust valve 44. Thus the diaphragm tends to maintain a predetermined pressure in the lower portion 51 of the casing, determined by the loading of a spring 52 acting on the upper surface of the diaphragm. The upper end of the spring 52 rests against a plunger 53 on which is fixed a cap 54 mounted to slide vertically at the upper part of the sender unit, a cam 55 being provided for depressing the cap and thereby varying the loading of the spring 52. The cam 55 is carried on trunnions 56 extending through bearings 57 on the top of the sender unit, which trunnions are operated by an arm 58 connected to the pilot's throttle lever (not shown).

The setting of the cam 55 and consequently the air pressure maintained in the chamber 51 therefore depend on the setting of the pilot's throttle lever. An outlet port 59 in the chamber communicates, by way of a pipe 60, with the inlet port 19 and diaphragm 20 of the receiver unit. The setting of the diaphragm 20, which constitutes the pressure-sensitive element of the receiver unit, will therefore also correspond to the setting of the pilot's throttle lever.

The receiver unit 9 (see Fig. 5) is of generally similar construction to that described in my United States application Serial No. 358,415. It is associated with a servo-motor comprising the usual cylinder 10, piston 11, piston valve 12, swinging lever 13, pivoted at 14 to a bracket 15 projecting from the housing of the motor, and follow-up gear 16. 17 is an oil inlet port and 18 is an oil outlet port. On movement of the diaphragm 20 as a result of change in the air pressure in the pipe line 60, the piston valve 12 is displaced in the appropriate direction opening ports for connecting one side of the cylinder 10 to the oil inlet 17 and the other to the oil outlet 18. Thus, supposing the air pressure above the diaphragm 20 to decrease, the piston valve 12 will be displaced upwardly, permitting oil to flow from the inlet 17 through ports 29, 30, 31 to the top of the cylinder and from the bottom of the cylinder through ports 32, 33, 34 to the oil outlet 18. The piston 11 will therefore move down, swinging the lever 13 clockwise about its pivot and lowering the piston valve 12 to its neutral position through the intermediary of the follow-up gear 16 and spring 37 in the well known manner. Conversely, if the pressure above the diaphragm 20 increases, the piston valve 12 will move down, connecting the oil inlet 17 through the ports 29, 33, 32 to the lower end of the cylinder, and the upper end of the cylinder through the ports 31, 30, 134 to a passage 35, connected to the oil outlet 18 by a bore formed in the wall of the housing, which is not visible in the section shown in Fig. 4. The piston 11 will therefore rise, returning the piston valve 12 to its neutral position through the intermediary of the follow-up gear 16 as before. The lower diaphragm 36 is not exposed to air pressure but makes provision for self-alignment of the piston valve. It is necessary for the piston valve to respond to very small pressure differences, and therefore any side thrust on the valve must be avoided.

The fitting 22 on the lower end of the piston rod 21 is connected, via the rod 62, to the throttle valve 63, so that the latter will take up a position determined by the position of the piston. The apparatus is shown in the drawings with the piston 11 in its lowermost position which corresponds to idling of the engine. Should the oil pressure be cut off under these conditions, the piston 11 will be automatically raised by a double spring 23, acting through a rod 25 and collar 26 on the swinging link 13 in the manner described in my United States application Serial No. 358,415, thereby moving the throttle valve into an open position suitable for starting (i. e. a position about 10° open).

The chamber 24 which receives the compressed air entering the receiver unit from the pipe line 60 contains a second diaphragm 70 located above the diaphragm 20 and urged downwardly by a spring 71. So long, however, as the compressed air supply is functioning, the air pressure holds the spring loaded diaphragm 70 up against a stop constituted by a shoulder 72 formed on the cover 73 of the chamber 24. In this position a tappet 74 carried by the diaphragm 70 is held clear of the diaphragm 20. Should the air pressure fail, the spring 71 will move the diaphragm 70 down, thereby causing the tappet 74 to press on the diaphragm 20 fitted to the control valve 12 with a pressure equivalent to the normal transmission air pressure for cruising, thus moving the piston 11 of the servo-motor, and consequently the throttle valve 63, to the cruising position.

Although the invention has been described above with reference to its application to the control of the throttle of an aircraft engine, it will nevertheless be understood that it has many other applications. Thus, for example, where the fluid-pressure system is employed for actuating the rudder of an aircraft, the biasing device may be employed to return the rudder to the central position in the event of the pressure in the pipe line failing, for example owing to the pipe line being shot away.

What I claim as my invention and desire to secure by Letters Patent is:

1. In a remotely controlled servo-motor installation of the kind comprising a chamber containing a pressure-sensitive element exposed to fluid pressure supplied under manual control to the chamber from a distant source, a relay valve operatively connected to the pressure-sensitive element, and a servo piston operating under the control of the relay valve to take up a position determined by the load exerted on the pressure-sensitive element by the fluid pressure prevailing in said chamber, the combination with the pressure-sensitive element of a biassing device located in the chamber and normally maintained inoperative body by said fluid pressure therein, said biassing device being arranged to engage and move the pressure-sensitive element and therefore the servo piston to a predetermined position upon failure of said fluid pressure in the chamber.

2. In a remotely controlled servo-motor installation of the kind comprising a chamber containing a pressure-sensitive element exposed to fluid pressure supplied under manual control to the chamber from a distant source, a relay valve operatively connected to the pressure-sensitive element, and a servo piston operating under the control of the relay valve to take up a position determined by the load exerted on the pressure-sensitive element by the fluid pressure prevailing in said chamber, the combination with the pressure-sensitive element of a diaphragm located in the chamber, a tappet carried by said diaphram on the side nearest the pressure-sensitive element, and a spring operating on the remote side of the diaphragm, said spring being normally overridden by the fluid pressure in the chamber so that the tappet is maintained clear of the pressure-sensitive element but operating in the event of failure of said fluid pressure, to engage the tappet with the pressure-sensitive element and thus apply a predetermined load to said element.

3. In a remotely controlled throttle valve mechanism of the kind comprising a pressure-sensitive element exposed to fluid pressure supplied thereto from a distant source under the control of a remotely situated throttle lever, a relay valve operatively connected to the pressure-sensitive element, a throttle valve, a servo piston linked to the throttle valve and operated under the control of the relay valve by a second fluid-pressure system, independent of that controlling the setting of the pressure-sensitive element, to maintain the throttle valve in a position determined by the pressure acting on the pressure-sensitive element, the combination with the pressure-sensitive element of a biassing device, exposed to and normally held inoperative by the fluid pressure acting on the pressure-sensitive element but operating in the event of failure of said fluid pressure to apply to the pressure-sensitive element a load effective to move the throttle valve to a predetermined partially open position.

EDWARD DODSON.

CERTIFICATE OF CORRECTION.

Patent No. 2,364,352.                                            December 5, 1944.

EDWARD DODSON.

It is hereby certified that error appears in the printed specification of the above numbered patent requiring correction as follows: Page 2, second column, line 23, claim 1, after the word "inoperative" strike out "body"; and that the said Letters Patent should be read with this correction therein that the same may conform to the record of the case in the Patent Office.

Signed and sealed this 20th day of February, A. D. 1945.

Leslie Frazer (Seal)                                     Acting Commissioner of Patents.